United States Patent Office 3,421,792
Patented Jan. 14, 1969

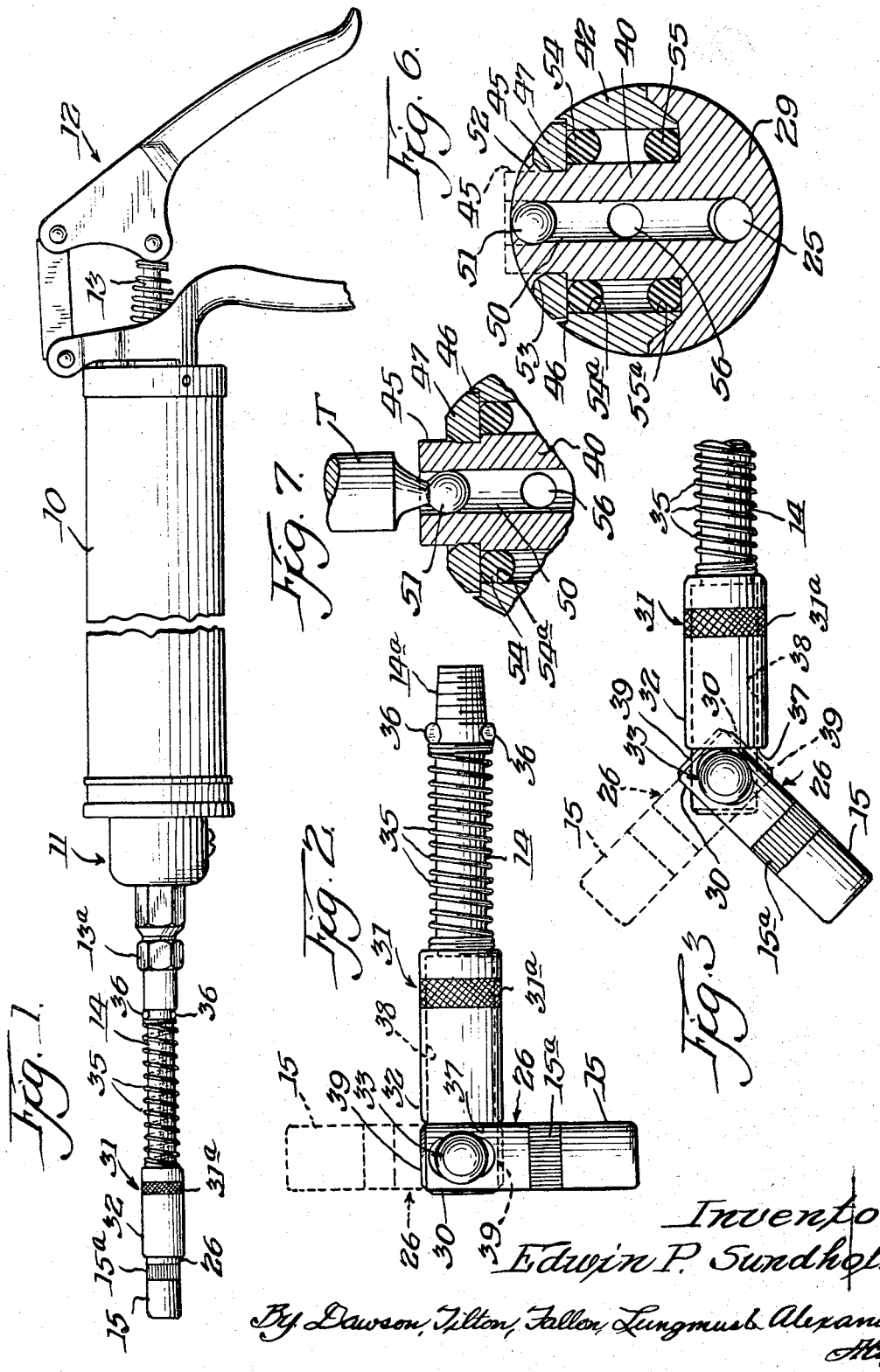

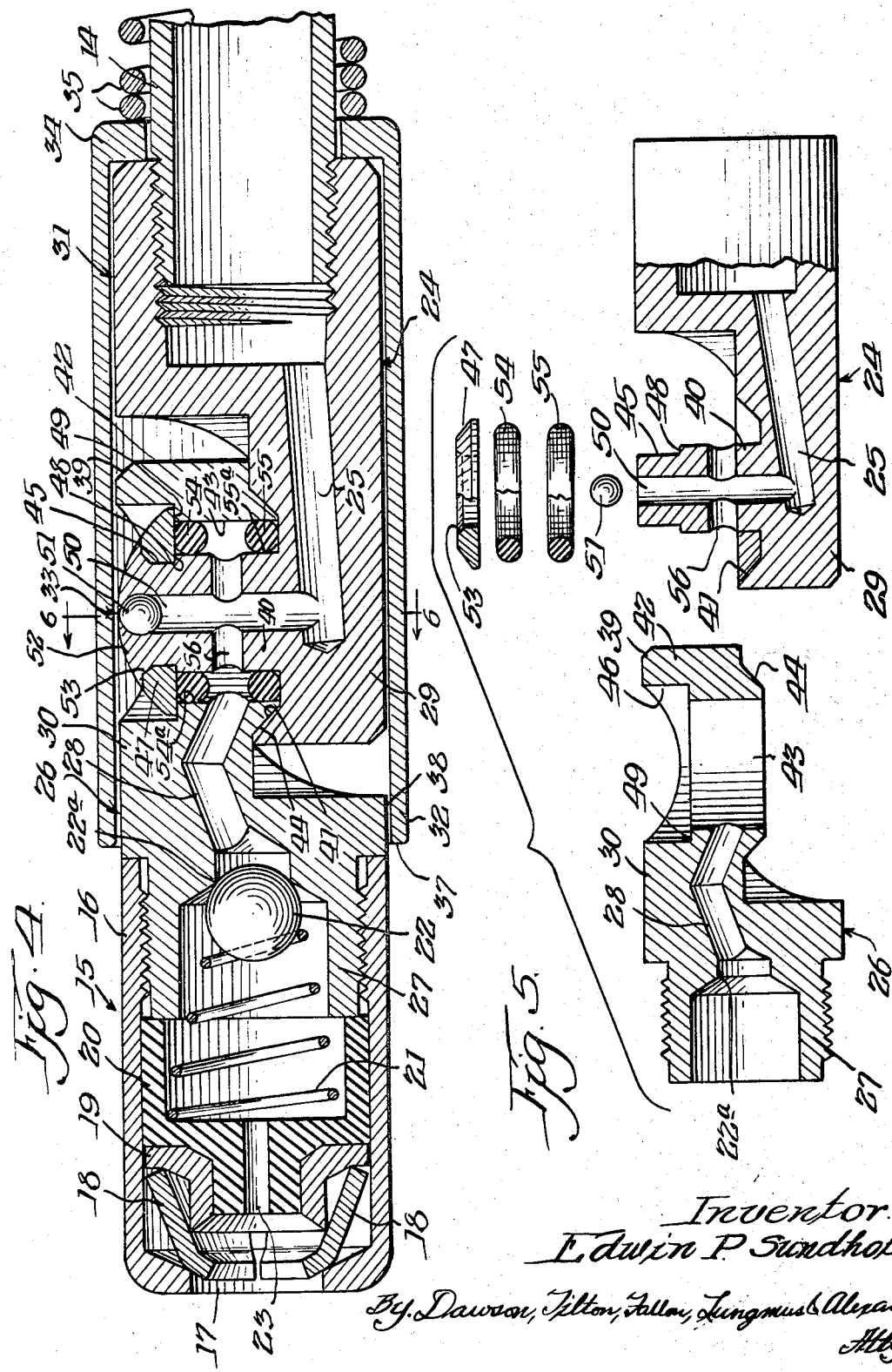

3,421,792
ANGULARLY ADJUSTABLE COUPLER ASSEMBLY
Edwin P. Sundholm, Albert City, Iowa 50510
Filed Feb. 2, 1966, Ser. No. 524,589
U.S. Cl. 285—98                7 Claims
Int. Cl. F16l 17/02; F16l 27/00; F16l 41/00

ABSTRACT OF THE DISCLOSURE

An angularly adjustable coupler assembly for application to a grease fitting. The coupler assembly is highly compact and does not substantially enlarge the usual size of the coupler and grease pipe, thereby facilitating insertion of the assembly in restricted spaces. The coupler assembly includes a connector body having its rearward end connected to the grease supply pipe and its forward end providing a transversely projecting stud with an annular seat around its base. A connector swivel is adapted at its forward end to be connected to a grease fitting and is provided at its rearward end with a collar having a transversely extending bore which is loosely received on the connector body stud. The inner side of the collar bears against the annular seat around the base of the stud and the outer portion of the collar bore is enlarged to receive a washer which is inserted over the end of the stud. Abutment means in the collar bore limit the inward movement of the washer and the outer end of the stud is forced transversely outwardly of the stud to lock the washer on the stud and to hold the collar on the stud.

---

This invention relates to an angularly adjustable coupler assembly for application to a grease fitting. The coupler assembly of this invention may be advantageously used in conjunction with hand grease guns, such as lever or pistol guns, which are manually held and operated for greasing automobiles, tractors, and other equipment.

Hand grease guns are commonly equipped with a grease outlet pipe, which may be either rigid or flexible, an which usually extends forwardly from the grease dispensing head of the gun. The grease outlet pipe receives grease under pressure from the high pressure cylinder of the gun. The grease outlet pipe usually terminates in a coupler or similar device for application to the grease fitting. Snap-on couplers are in common use, and have the advantage that once attached to the fitting, they will remain attached until forcibly separated from the fitting. However, grease fittings are frequently located in relatively inaccessible positions on the automobile, tractor, or other equipment. It may be difficult or impossible to attach the coupler to the fitting where the grease pipe and coupler are in axial alignment with the grease gun. This problem is complicated by the fact that the route of access to the fitting may be extremely narrow, making it extremely difficult to insert any device of substantially greater dimensions than the coupler or grease pipe. Consequently, there has long been a need for an angularly adjustable coupler assembly which would permit the coupler to be selectively adjusted to various angles with respect to the axis of the grease pipe or grease gun, while at the same time permitting the coupler assembly to be maneuvered into narrow or confined quarters.

Summary of the invention

The invention provides an angularly adjustable coupler assembly for use with a hand grease gun which will permit application of the coupler to grease fittings which can be reached most advantageously and conveniently by adjusting the coupler to a selected angle with respect to the axis of the grease pipe and grease gun. The coupler assembly includes a highly compact swivel connector assembly which permits the angular adjustment of the coupler and which does not substantially enlarge the usual size of the coupler and grease pipe. The swivel assembly is durably constructed with a minimum of parts and is able to withstand repeated swivelling and internal pressures as high as 10,000–12,000 p.s.i. As the pressure increases, the sealing engagement between the parts of the swivel assembly also increases. The swivel assembly includes a slidable outer sleeve which cooperates with the other parts of the swivel to releasably lock the coupler in selected angular positions.

This invention is shown in an illustrative embodiment in the accompanying drawings, wherein:

FIGURE 1 is a side elevational view of a hand grease gun to which is attached a coupler assembly constructed in accordance with the present application;

FIG. 2 is a side elevational view of the coupler assembly of FIG. 1, two selected angular positions of the coupler being illustrated;

FIG. 3 is a fragmentary side elevational view of the same coupler assembly, two other selected angular positions being illustrated;

FIG. 4 is a side sectional view of the coupler assembly, part of the spring and grease outlet pipe being broken away to permit the other elements to be shown in larger dimensions;

FIG. 5 is a side elevational view showing the elements forming the swivel connector assembly in separated relation, some of the elements being shown in full section, and others in part section;

FIG. 6 is a transverse sectional view taken on line 6—6 of FIG. 4, the shape of the swivel stud before the spinning operation being shown in dotted lines; and FIG. 7 is an enlarged fragmentary sectional view similar to FIG. 6, illustrating the procedure for inserting the ball in the swivel stud.

Looking first at FIGURE 1, there is shown a grease gun having a barrel or cylinder 10 with a dispensing head 11 mounted on the front end thereof and operating handle means 12 of the pistol grip type mounted on the rear thereof. With this construction, the actuation of the rod 13 causes grease to be dispensed under high pressure from the dispensing head 11, which contains a high pressure cylinder. The grease under pressures of 10,000–12,000 p.s.i. is discharged from the high pressure cylinder through a valve body 13a, which contains an outlet check valve, into the grease outlet pipe 14, which is provided with a threaded rear end 14a (FIG. 2) for connection to the forward end of valve body 13. The construction and operation of this particular grease gun is described more fully in my copending application Ser. No. 444,156, filed Mar. 31, 1965, entitled "Axially-Operated Hand Grease Gun." It will be understood, however, that the angularly adjustable coupler assembly of this invention, which will now be described in detail, may be advantageously employed with other hand grease guns or greasing equipment.

In addition to the grease supply pipe 14, the coupler assembly includes a grease fitting coupler or coupler means 15, which is of the snap-on type. As shown more clearly in FIG. 4, the construction of grease outlet pipe 14 and coupler 15 is relatively conventional. The snap-on coupler 15 includes an outer shell 16 which provides a front opening 17. Within the interior of shell 16 are spring-urged movable jaws 18, which are acted on by slidable camming member 19, a grommet 20, and spring 21. Grommet 20 is formed of a grease-resistant material such as synthetic rubber, and provides a slidable seal between the outside thereof and the inside of case 16. In the illustration given, the rear end of spring 21 urges a ball 22 to provide an outlet check valve. When ball 22 is moved forwardly, the grease flows out through passage 23 provided by grommet 20 and through opening 17 into the grease fitting being gripped by jaws 18.

In accordance with the present invention, a swivel connector assembly is provided to adjustably interconnect coupler 15 and grease supply pipe 14. As shown more clearly in FIGS. 4 and 5, this swivel connector assembly includes a connector body 24 having its rear end threadedly connected to the forward end of the grease supply pipe 14. Connector body 24 provides an internal grease passage 25 which communicates with the grease supply pipe 14.

The swivel connector assembly also includes a connector swivel 26 having its forward end 27 threadedly connected to the rearward end of coupler shell 16. Swivel 26 provides an internal grease passage 28 which communicates with the interior of the coupler when ball valve 22 is displaced from its seat 22a.

In accordance with the present invention, there is provided pivotal joint means associated with and hydraulically connecting the forward end 29 of connector body 24 and the rearward end 30 of connector swivel 26. The pivot joint means has a pivot axis aligned transversely with respect to the axis of body 24, and the joint means provides a sealed grease passage extending between body passage 25 and swivel passage 28. The preferred construction of these elements will be subsequently described in detail.

The coupler assembly of this invention includes a sleeve 31, as shown in FIGS. 1–4, which is slidably received on body 24 for axial movement with respect thereto. As shown more clearly in FIG. 4, the sleeve 31 provides a tubular forward portion 32 which is extensible over the pivotal joint means, designated generally as 33 in FIG. 4, and onto swivel 26 for holding the swivel in axial alignment with body 24. Coupler 15, swivel 26, and body 24 are shown in axial alignment with pipe 14 in FIGS. 1 and 4.

The rear portion of sleeve 31 provides an inwardly-extending annular shoulder 34 (FIG. 4) which seats against the rearward end of body 24 to limit the forward movement of the sleeve under the urging of coil spring 35, or other spring means. In the illustration given, coil spring 35 is received on the grease pipe 14. The rearward portion of grease pipe 14 is provided with a pair of outwardly formed ears 36 (FIGS. 1 and 2) which restrict the rearward movement of spring 35, and maintain the spring under yieldable compression for urging sleeve 31 forwardly.

As shown more clearly in FIGS. 2 and 3, the rearward portion of sleeve 31 is extensible onto the forward portion of pipe 14, with the forward sleeve portion 32 retracted rearwardly of the pivot joint means 33 to permit swivel 26 and coupler 15 to be turned to selected angular positions. In FIG. 2, two positions of the coupler 15 and the swivel 26 are illustrated, one in solid lines and one in dotted lines. As there shown, the coupler and swivel may be adjusted to either of two positions at right angles to the axis of pipe 14 and sleeve 31. In FIG. 3, two intermediate positions are illustrated, one being in solid lines and one in dotted lines as in FIG. 2. As there shown, the coupler 15 and the swivel 26 may be arranged at various angular positions with respect to pipe 14 and sleeve 31, such as the approximate 45 degree angular positions shown.

The forward end of sleeve 31 and the rearward end of swivel 26 are adapted for engagement to assist in maintaining the sleeve 26 at the selected angular position. In the illustration given, the forward end 32 of the sleeve 31 is provided with an annular face or shoulder 37 around the forward end of the axial bore 38 therein for engaging portions of the side and rear of swivel 26 when the swivel is turned to a selected angular position, as in FIGS. 2 and 3. For example, as shown in FIG. 2, the rearward portion 30 of the swivel is dimensioned to extend outwardly onto or slightly beyond the sleeve flange 37 so that opposite sides of the flange will bear against the rearward portion 30 when the swivel 26 is turned at right angles to sleeve 31.

At its extreme rear, swivel 26 may be provided with an annular beveled surface 39, which bears against the inner edge of shoulder 27 when the swivel 26 is turned to intermediate angular positions, as shown in FIG. 3. An adjustable frictional engagement is therefore provided between shoulder 37 and bevel flange 39, which permits coupling 15 and swivel 26 to be held in a selected position for direction onto a fitting while being somewhat self-adjusting for the final connection.

The preferred construction of the pivotal joint means 33 is illustrated particularly in FIGS. 4–7. One important advantage of the particular swivel joint means of this invention is that it can be formed very compactly, while providing a hydraulically sealed swivel joint which is extremely durable in use. As shown in FIG. 4, the joint means 33 is confined within the adjacent end portions 29 and 30, respectively, of body 24 and swivel 26. Further, all of the components of the pivotal joint can be kept well within the internal diameter of sleeve 31 so that when the components of the coupler assembly are axially aligned, none of the components have transverse dimensions greater than the outer dimension of the sleeve 31.

In the preferred construction as shown, the forward end 29 of connector body 24 provides a transversely projecting stud 40, which preferably has an axis at right angles to the principal axis of body 24 and sleeve 31. The end portion 29 is cut out around stud 40 and at the base thereof provides an annular seat 41. The rearward end portions 30 of swivel 26 provide a collar 42 surrounding a bore 43 having an axis at right angles to the main axis of body 26 and coupler 15. As shown in FIG. 4, the parts are assembled with stud 40 extending through bore 33, the stud being loosely received within the collar 42, thereby permitting swivel 26 to pivot with respect to connector body 24. The inner side of collar 42 provides an annular portion 44 which mates with and is rotationally received within the base recess 41. With this arrangement, the inner side of collar 42 bears against seat 41, which thereby stabilizes the collar. Swivel inner end 40 is cut out inwardly of seating portion 45 to provide a space for the positioning of body forward end 29, as shown in FIG. 4.

The outer portion of stud 40 is provided with a neck 45, and the collar bore 43 is enlarged at 46, which enlarged portion receives neck 45 in assembled condition, as shown in FIG. 4. A washer 47 is received on neck 45 within the enlarged bore portion 46. Abutment means is provided limiting the inward movement of washer 47 on neck 45. In the illustration given, an annular flange or offset 48 is provided between neck 45 and stud body 40, and an annular flange or offset 49 is provided between enlarged bore portion 46 and the rest of the bore 43. With this construction, as shown in FIG. 4, the inner face of washer 47 is supported on both of the flanges or offsets 48 and 49. It will be understood, however, that one of the flanges may be omitted, or other abutment means provided.

In the preferred construction of the present invention, the extreme outer portion of neck 45 is expanded to lock washer 47 to neck 45 and to hold collar 42 on stud 40. As will be noted, stud 40 is provided with a bore 50 extending inwardly from the outer end thereof, and which provides a grease passage communicating with the forward end of body passage 25. A ball of hard metal 51, such as a steel ball bearing, is inserted through the outer end of bore 50 to expand neck portion 45 against the inside of washer 47 to provide an interlock therebetween.

For the purpose just described, it will be understood that ball 51 will be formed of slightly greater diameter (e.g., .010 to .012″) larger than the diameter of bore 50. With washer 47 in place on neck 45, as shown in FIG. 7, ball 51 may then be pressed into bore 50 by means of a suitable tool T. This will cause neck 45 to expand outwardly to form a tight fractional interlock with washer 47. Washer 47 will thereby be locked to neck 45 so that it rotates with neck 45.

After the insertion of ball 51, as just described, the outer portion of neck 45 may be spun over the outer surface of ball 51 and over the adjacent outer portions of washer 47 to provide a head 52 (FIGS. 4 and 6) for locking ball 51 within bore 50 and washer 47 on stud neck 45. In FIG. 7, the appearance of the extreme outer end portion of neck 45 prior to the spinning or spreading operation is illustrated, while FIG. 6 shows the head 52 after the forming of the outer portion of the neck 45, which neck portion is shown in dotted lines in FIG. 6. Since this type of metal spinning or spreading procedure is well known in the art, it is not believed it will be necessary to further describe it herein.

Since in the operation of the coupler the bore 50 will contain grease under very high pressure, considerable force will be exerted, tending to force washer 47 off of neck 45 with the fracturing or breaking of head 52. In other words, washer 47 will have a tendency to shear off head 52. To reduce this tendency, it has been found desirable to form a beveled annular face 53, such as the flat face shown, on the outer face of washer 47 adjacent the opening therethrough which receives neck 45. As shown more clearly in FIGS. 4 and 6, the inclined or beveled annular face 53 is located adjacent the sides of stud neck 45 and immediately inwardly of spun head 52. This construction eliminates a sharp corner at this location, which could act to cut or sever portions of head 52. Annular face 53 may be provided with a radius.

To provide a hydraulic grease seal between interconnected portions of body 24 and swivel 26, suitable gasket means is provided, such as the gasket rings 54 and 55, which may be O-rings or other shapes, such as square or rectangular cross sections. Gaskets 54 and 55 may be formed of any suitable sealing material, such as the grease-resistant rubber or various synthetic rubbers that are well known in the art. The O-ring gaskets 54 and 55 are dimensioned to be snugly received on stud 40, so that they substantially completely fill, respectively, the annular recesses 54a and 55a (FIG. 4). As will be seen, the recess 54a is provided between adjacent surfaces of stud 40, washer 47, and collar 42, while the recess 55a is provided by the adjacent surfaces of stud 40 and collar 42.

The central portion of stud 40 is provided with a transverse bore 56, which is arranged to lie between the gaskets 54 and 55 in the completed assembly, and thereby to provide communication between bore 50 and swivel passage 28.

*Operation*

The general operation of the coupler assembly has already been described. On the retraction of sleeve 31, the coupler 15 and swivel 26 may be adjusted to any selected angular position, for example, the positions illustrated in FIGS. 2 and 3. However, the internal operation of the pivotal joint means 33 has not been fully described.

The grease under high pressure is forced through passage 25 into bore 50 which connects with the bore 56. The grease flows between the ring gaskets 54 and 55 into swivel passage 28, unseating the ball valve 22 to flow outwardly through the coupler 15. It will be understood that coupler 15 will be attached to a grease fitting in the standard manner before the grease flow is initiated.

In operation, the pressure of the grease within the pivot joint 33 will force the ring gaskets 54 and 55 outwardly, thereby maintaining a tight sealing engagement within the annular seats provided by the adjacent parts. The wear on the ring gaskets and associated parts is minimal.

The construction of washer 47, particularly the beveled face 53 thereof and the corresponding construction of head 52, will maintain ball 51 within passage 50 and washer 47 in position on neck 45 under high grease pressure and with repeated use. Thus, the compactness of the present construction is not achieved at a sacrifice of durability.

While the coupler assembly of this invention is rigidly mounted on the dispensing head 11, as by valve body 13a and outlet pipe 14, the coupler 15 can be guided onto the fitting without the operator having to apply a hand to the coupler assembly. The gun may be held from the rear with one or both hands, and the coupler 15 guided onto the fitting after it has been adjusted to the selected angle. It will be understood that this provides considerable convenience when maneuvering the coupler assembly into and through narrow spaces.

While not essential to the present invention, means may be provided to facilitate gripping of sleeve 31 and/or coupler 15. As shown, sleeve 31 is provided on the outside with a knurled band 31a, and coupler 15 with a knurled band 15a.

While in the foregoing specification this invention is described in relation to a preferred embodiment thereof and many details have been set forth for purpose of illustration, it will be apparent to those skilled in the art that the invention is susceptible to addition embodiments, and that certain of the details described herein can be varied considerably without departing from the basic principles of the invention.

I claim:

1. In an angularly adjustable coupler assembly for application to a grease fitting, including grease fitting coupler means and a grease supply pipe, the swivel connector assembly adjustably interconnecting said coupler means and said supply pipe which comprises:
   (a) a connector body having its rearward end connected to the forward end of said grease supply pipe and providing an internal grease passage;
   (b) a connector swivel providing an internal grease passage and having its forward end connected to said coupler means and its rearward end connected to said connector body;
   (c) pivotal joint means associated with and hydraulically connecting the said forward end of said body and the said rearward end of said swivel,
   said joint means having a pivot axis aligned transversely with respect to the axis of said body and said joint means providing a sealed grease passage extending between said body passage and swivel passage
   one of the adjacent end portions of said connector body and said connector swivel providing a transversely projecting stud with an annular seat around the base thereof, the other of said adjacent end portions providing a collar with a transversely extending circular bore loosely received on said stud for pivoting thereon with the inner side of said collar bearing against said annular seat, the outer portion of said stud providing a neck, said collar bore being enlarged around said neck, a washer received on said neck within said enlarged bore portion, abutment means limiting the inward movement of said washer on said neck, the outer end portion of said neck having means thereon locking said washer to said neck and hold said collar on said stud;
   (d) a circumferentially continuous sleeve having an axial bore slidably received on said body for axial movement with respect thereto,
   said sleeve having a forward portion extendable over said joint means and onto said swivel for holding said swivel in axial alignment with said body,
   said sleeve having a rearward portion extendable onto said pipe when its said forward portion is retracted rearwardly of said joint means to permit said swivel to be turned to selected angular positions, said sleeve at its forward end providing a shoulder around the forward end of said bore engaging selectively portions of the sides and rear of said swivel when said swivel is turned to a selected angular position thereby retaining said swivel in said selected angular position;

(e) stop means limiting the forward movement of said sleeve when extended over said swivel; and (f) spring means arranged to yieldably urge said sleeve forwardly.

2. The coupler assembly of claim 1 wherein said stud provides a bore extending inwardly from the outer end thereof, and wherein a ball of slightly larger diameter than that of said bore is seated in the outer end thereof, the outer portion of said neck extending inwardly transversely of said stud to provide a head for locking said ball in said stud bore, the portion of said neck around said ball extending outwardly transversely of said stud against the inside of said washer to provide an interlock therebetween.

3. The coupler assembly of claim 2 wherein the outside portion of said washer adjacent said stud neck and immediately inwardly of said outer neck portion provides an inclined annular face to reduce the tendency of said washer to shear off said head.

4. The coupler assembly of claim 2 wherein said passage means is provided in said connector body and connector swivel communicating with a passage extending axially from the central portion of said stud bore and wherein the laterally adjacent portions of said swivel and said body on each side of said axial passage provide annular seats, and wherein annular gaskets are received in said seats.

5. In an angularly adjustable coupler assembly, a swivel connector assembly comprising:

(a) a connector body having its rearward end connected to the forward end of a grease supply pipe and providing an internal grease passage;

(b) a connector swivel providing an internal grease passage and having its forward end adapted to be connected to a grease fitting coupler and its rearward end connected to said connector body.

(c) pivotal joint means associated with and hydraulically connecting the said forward end of said body and the said rearward end of said swivel, said joint means having a pivot axis aligned transversely with the axis of said body and providing a sealed grease passage extending between said body passage and swivel passage; and said connector body providing a transversely projecting stud with an annular seat around the base thereof, the other of said adjacent end portions providing a collar with a transversely extending circular bore loosely received on said stud for pivoting thereon, with the inner side of said collar bearing against said annular seat, the outer portion of said stud providing a neck, said collar bore being enlarged around said neck, a washer received on said neck in said enlarged bore portion, abutment means limiting the inward movement of said washer on said neck, said stud providing a bore extending inwardly from the outer end thereof, a ball of slightly larger diameter than that of said bore seated in the outer end thereof, the portion of said neck around said ball extending outwardly against the inside of said washer to provide an interlock therebetween, the outer portion of said neck extending inwardly over said ball and outwardly over adjacent portions of said washer to provide a head for locking said ball in said bore and said washer on said neck.

6. The swivel connector assembly of claim 5 wherein the outside portion of said washer adjacent said stud neck and immediately inwardly of said transversely extending portion provides a beveled annular face to reduce the tendency of said washer to shear off said head.

7. The swivel connector assembly of claim 5 wherein said passage means is provided in said connector body and connector swivel communicating with a passage extending axially from the central portion of said stud bore and wherein the laterally adjacent portions of said swivel and said body on each side of said axial passage provide annular seats, and wherein annular gaskets are received in said seats.

References Cited

UNITED STATES PATENTS

| | | | |
|---|---|---|---|
| 673,280 | 4/1901 | Moran | 285—190 X |
| 1,578,951 | 3/1926 | Bersted | 285—123 X |
| 1,753,677 | 4/1930 | Andresen | 29—523 |
| 1,778,217 | 10/1930 | Johnson | 285—185 X |
| 2,165,621 | 7/1939 | Donahue et al. | 285—382.4 X |
| 2,176,295 | 10/1939 | Creveling | 285—184 |
| 2,754,573 | 7/1956 | Schoessaw | 29—523 X |
| 2,794,357 | 6/1957 | Lykins | 287—98 X |
| 3,285,639 | 11/1966 | Galla et al. | 287—53 |

FOREIGN PATENTS 989,065   9/1951   France.

CARL W. TOMLIN, *Primary Examiner.*

DAVE W. AROLA, *Assistant Examiner.*

U.S. Cl. X.R.

285—184, 190, 102; 29—523